(12) United States Patent  
Lin et al.

(10) Patent No.: US 11,356,657 B2  
(45) Date of Patent: Jun. 7, 2022

(54) METHOD AND APPARATUS OF AFFINE INTER PREDICTION FOR VIDEO CODING SYSTEM

(71) Applicant: MEDIATEK INC., Hsinchu (TW)

(72) Inventors: Zhi-Yi Lin, Hsinchu (TW); Tzu-Der Chuang, Hsinchu (TW); Ching-Yeh Chen, Hsinchu (TW)

(73) Assignee: HFI INNOVATION INC., Hsinchu (TW)

( * ) Notice: Subject to any disclaimer, the term of this patent is extended or adjusted under 35 U.S.C. 154(b) by 97 days.

(21) Appl. No.: 16/962,900

(22) PCT Filed: Jan. 24, 2019

(86) PCT No.: PCT/CN2019/072980
§ 371 (c)(1),
(2) Date: Jul. 17, 2020

(87) PCT Pub. No.: WO2019/144908
PCT Pub. Date: Aug. 1, 2019

(65) Prior Publication Data
US 2021/0067771 A1    Mar. 4, 2021

Related U.S. Application Data

(60) Provisional application No. 62/665,585, filed on May 2, 2018, provisional application No. 62/622,227, filed on Jan. 26, 2018.

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/159* (2014.11); *H04N 19/176* (2014.11)

(58) Field of Classification Search
CPC .. H04N 19/109; H04N 19/105; H04N 19/119; H04N 19/159; H04N 19/176;
(Continued)

(56) References Cited

U.S. PATENT DOCUMENTS 7,200,174 B2    4/2007    Lainema et al.
10,560,712 B2   2/2020    Zou et al.
(Continued)

FOREIGN PATENT DOCUMENTS

CN    1418437 A    5/2003
TW    201742465 A  12/2017
(Continued)

OTHER PUBLICATIONS

Recent Development of AVS Video Coding Standard, Zhang et al, IEEE, PCS, Nov. 12-15, 2019 (Year: 2019).*
(Continued)

*Primary Examiner* — Joon Kwon
(74) *Attorney, Agent, or Firm* — McClure, Qualey & Rodack, LLP

(57) ABSTRACT

Methods and apparatus of Inter prediction for video coding including affine Inter mode are disclosed. In one method, an affine MVP candidate list is generated, wherein the affine MVP candidate list comprises at least one inherited affine MVP derived from a neighbouring block set. Prediction differences of a current control-point MV set associated with the affine motion model are encoded using one predictor selected from the affine MVP candidate list at the video encoder side or the prediction differences of the current control-point MV set associated with the affine motion model are decoded at the video decoder side using one predictor selected from the affine MVP candidate list. In another method, the inherited affine MVP is derived by considering whether at least one of reference picture lists of
(Continued)

said at least one neighbouring block includes one reference picture being the same as a current reference picture of the current block.

31 Claims, 6 Drawing Sheets

(51) Int. Cl.
*H04N 19/159* (2014.01)
*H04N 19/176* (2014.01)

(58) Field of Classification Search
CPC ...... H04N 19/537; H04N 19/54; H04N 19/52; H04N 19/527
See application file for complete search history.

(56) References Cited

U.S. PATENT DOCUMENTS

| | | | |
|---|---|---|---|
| 10,582,215 B2 | 3/2020 | Jang et al. | |
| 11,202,089 B2* | 12/2021 | Li | H04N 19/44 |
| 2019/0327482 A1* | 10/2019 | Lin | H04N 19/513 |
| 2020/0059651 A1* | 2/2020 | Lin | H04N 19/52 |
| 2020/0077113 A1* | 3/2020 | Huang | H04N 19/55 |
| 2020/0092578 A1* | 3/2020 | Huang | G06T 3/0075 |
| 2020/0112725 A1* | 4/2020 | Huang | H04N 19/122 |
| 2020/0120335 A1* | 4/2020 | Hung | H04N 19/105 |
| 2020/0128266 A1* | 4/2020 | Xu | H04N 19/137 |
| 2020/0154101 A1* | 5/2020 | Li | H04N 19/46 |
| 2020/0186818 A1* | 6/2020 | Li | H04N 19/96 |
| 2020/0195948 A1* | 6/2020 | Li | H04N 19/105 |
| 2020/0195966 A1* | 6/2020 | Lee | H04N 19/96 |
| 2020/0213585 A1* | 7/2020 | Huang | G06F 17/16 |
| 2020/0221108 A1* | 7/2020 | Xu | H04N 19/105 |
| 2020/0221119 A1* | 7/2020 | Lee | H04N 19/573 |
| 2020/0228815 A1* | 7/2020 | Xu | H04N 19/513 |
| 2020/0228828 A1* | 7/2020 | Li | H04N 19/44 |
| 2020/0236376 A1* | 7/2020 | Li | H04N 19/176 |
| 2020/0236383 A1* | 7/2020 | Li | H04N 19/105 |
| 2020/0244978 A1* | 7/2020 | Li | H04N 19/54 |
| 2020/0244979 A1* | 7/2020 | Li | H04N 19/137 |
| 2020/0260095 A1* | 8/2020 | Li | H04N 19/176 |
| 2020/0260106 A1* | 8/2020 | Huang | H04N 19/176 |
| 2020/0267406 A1* | 8/2020 | Chang | H04N 19/52 |
| 2020/0275094 A1* | 8/2020 | Lee | H04N 19/137 |
| 2020/0280733 A1* | 9/2020 | Li | H04N 19/52 |
| 2020/0288124 A1* | 9/2020 | Li | H04N 19/109 |
| 2020/0288157 A1* | 9/2020 | Li | H04N 19/105 |
| 2020/0288175 A1* | 9/2020 | Chang | H04N 19/96 |
| 2020/0296382 A1* | 9/2020 | Zhao | H04N 19/119 |
| 2020/0296383 A1* | 9/2020 | Li | H04N 19/58 |
| 2020/0296411 A1* | 9/2020 | Li | H04N 19/54 |
| 2020/0296415 A1* | 9/2020 | Chen | H04N 19/52 |
| 2020/0304805 A1* | 9/2020 | Li | H04N 19/117 |
| 2020/0304826 A1* | 9/2020 | Li | H04N 19/176 |
| 2020/0304828 A1* | 9/2020 | Huang | H04N 19/436 |
| 2020/0336735 A1* | 10/2020 | Chang | H04N 19/159 |
| 2020/0351495 A1* | 11/2020 | Li | H04N 19/54 |
| 2020/0359039 A1* | 11/2020 | Zhao | H04N 19/503 |
| 2020/0359049 A1* | 11/2020 | Zhao | H04N 19/423 |
| 2020/0374528 A1* | 11/2020 | Huang | H04N 19/159 |
| 2020/0374549 A1* | 11/2020 | Li | H04N 19/159 |
| 2020/0382771 A1* | 12/2020 | Liu | H04N 19/105 |
| 2020/0389663 A1* | 12/2020 | Li | H04N 19/176 |
| 2020/0404254 A1* | 12/2020 | Zhao | H04N 19/176 |
| 2020/0404282 A1* | 12/2020 | Li | H04N 19/159 |
| 2020/0404306 A1* | 12/2020 | Auyeung | H04N 19/44 |
| 2020/0413078 A1* | 12/2020 | Li | H04N 19/523 |
| 2020/0413082 A1* | 12/2020 | Li | H04N 19/159 |
| 2021/0029370 A1* | 1/2021 | Li | H04N 19/50 |
| 2021/0037257 A1* | 2/2021 | Lee | H04N 19/52 |
| 2021/0044824 A1* | 2/2021 | Li | H04N 19/523 |
| 2021/0084291 A1* | 3/2021 | Chang | H04N 19/52 |
| 2021/0092425 A1* | 3/2021 | Li | H04N 19/80 |
| 2021/0092432 A1* | 3/2021 | Rusanovskyy | H04N 19/159 |
| 2021/0092434 A1* | 3/2021 | Huang | H04N 19/109 |
| 2021/0099729 A1* | 4/2021 | Rusanovskyy | H04N 19/176 |
| 2021/0144366 A1* | 5/2021 | Zhang | H04N 19/176 |
| 2021/0144392 A1* | 5/2021 | Zhang | H04N 19/159 |
| 2021/0160528 A1* | 5/2021 | Chen | H04N 19/513 |
| 2021/0211676 A1* | 7/2021 | Nishi | H04N 19/52 |
| 2021/0227206 A1* | 7/2021 | Chiu | H04N 19/51 |
| 2021/0235100 A1* | 7/2021 | Lee | H04N 19/44 |
| 2021/0289209 A1* | 9/2021 | Lee | H04N 19/159 |
| 2021/0297703 A1* | 9/2021 | Li | H04N 19/176 |
| 2021/0306649 A1* | 9/2021 | Chen | H04N 19/176 |
| 2021/0314586 A1* | 10/2021 | Li | H04N 19/70 |
| 2021/0314596 A1* | 10/2021 | Wang | H04N 19/119 |
| 2021/0314601 A1* | 10/2021 | Chen | H04N 19/96 |
| 2021/0377560 A1* | 12/2021 | Tamse | H04N 19/139 |
| 2021/0385462 A1* | 12/2021 | Deng | H04N 19/176 |
| 2021/0392357 A1* | 12/2021 | Xu | H04N 19/44 |
| 2021/0392366 A1* | 12/2021 | Li | H04N 19/52 |

FOREIGN PATENT DOCUMENTS

| | | |
|---|---|---|
| WO | 2014/056423 A1 | 4/2014 |
| WO | 2017/026681 A1 | 2/2017 |
| WO | 2017/118411 A1 | 7/2017 |
| WO | 2017/148345 A1 | 9/2017 |
| WO | 2017/157259 A1 | 9/2017 |
| WO | 2017/200771 A1 | 11/2017 |

OTHER PUBLICATIONS

Chinese language office action dated Apr. 6, 2021, issued in application No. Cn 201980006355.2.
International Search Report and Written Opinion dated Apr. 16, 2019, issued in application No. PCT/CN2019/072980.
Chinese language office action dated Jan. 30, 2020, issued in application No. TW 108102862.
Extended European Search Report dated Oct. 4, 2021, issued in application No. EP 19744185.0.
Hsu, C.-W., et al.; "Description of SDR video coding technology proposal by MediaTek;" Joint Video Experts Team (JVET) of ITU-T SG 16 WP 3 and ISO/IEC JTC 1/SC 29/WG 11; Apr. 2018; pp. 1-64.
Chen, H., et al.; "Affine SKIP and MERGE modes for video coding;" Oct. 2015; pp. 1-5.
Huawei Technologies; "Affine transform prediction for next generation video coding;" Telecommunication Standardization Sector; Sep. 2015; pp. 1-11.
Korean language office action dated Feb. 3, 2022, issued in application No. KR Application No. 10-2020-7023926.
English language translation of office action dated Feb. 3, 2022, issued in application No. KR application No. 10-2020-7023926.

* cited by examiner

METHOD AND APPARATUS OF AFFINE INTER PREDICTION FOR VIDEO CODING SYSTEM

CROSS REFERENCE TO RELATED APPLICATIONS

The present invention claims priority to U.S. Provisional Patent Application, Ser. No. 62/622,227, filed on Jan. 26, 2018 and U.S. Provisional Patent Application, Ser. No. 62/665,585, filed on May 2, 2018. The U.S. Provisional patent applications are hereby incorporated by reference in their entireties.

FIELD OF THE INVENTION

The present invention relates to video coding using motion estimation and motion compensation. In particular, the present invention relates to generating an Inter candidate list including one or more affine motion vector predictor (MVP) candidates associated with one or more blocks coded using the affine Inter mode.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signalling or implicit signalling. In explicit signalling, the motion vector for a block (i.e., PU) is signalled using a predictive coding method. The motion vector predictors correspond to motion vectors associated with spatial and temporal neighbours of the current block. After a MV predictor is determined, the motion vector difference (MVD) is coded and transmitted. This mode is also referred as AMVP (advanced motion vector prediction) mode. In implicit signalling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signalled to indicate the predictor selected as the MV for current block.

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 * x + a_2 * y, \text{ and}$$

$$y' = b_0 + b_1 * x + b_2 * y. \quad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \triangleq \begin{cases} vx = (1-a)x - by - e \\ vy = (1-a)y + bx - f \end{cases} \quad (2)$$

An example of the four-parameter affine model is shown in FIG. 1A. The transformed block is a rectangular block. The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (3)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 1B according to equation (3).

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 2 illustrates the neighbouring block set used for deriving the corner derived affine candidate. As shown in FIG. 2, the $\bar{v}_0$ corresponds to motion vector of the block V0 at the upper-left corner of the current block 210, which is selected from the motion vectors of the neighbouring block a0 (referred as the above-left block), a1 (referred as the inner above-left block) and a2 (referred as the lower above-left block), and the $\vec{v}_1$ corresponds to motion vector of the block V1 at the upper-right corner of the current block 210, which is selected from the motion vectors of the neighbouring block b0 (referred as the above block) and b1 (referred as the above-right block). In order to select the candidate MVP pair, a "DV" (named as distortion value in this disclosure) is calculated according to:

deltaHor=MVb−MVa deltaVer=MVc−MVa $$DV=|deltaHor\_x*height-deltaVer\_y*width|+\\|deltaHor\_y*height-deltaVer\_x*width| \quad (4)$$

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 210, which is selected from the motion vectors of the neighbouring block c0 (referred as the left block) and c1 (referred as the left-bottom block). In the example of FIG. 2, the neighbouring blocks (a0, a1, a2, b0, b1, b2, c0 and c1) used to construct the control point MVs for affine motion model are referred as a neighbouring block set in this disclosure.

In contribution ITU-T13-SG16-C1016, an affine Merge mode is also proposed. If the current block is a Merge coded PU, the neighbouring five blocks (A0, A1, B0, B1 and B2 blocks in FIG. 3) are checked to determine whether any of them is coded in affine Inter mode or affine Merge mode. If yes, an affine flag is signalled to indicate whether the current PU is affine mode. When the current PU is applied in affine merge mode, it gets the first block coded with affine mode from the valid neighbour reconstructed blocks. The selection order for the candidate block is from left block (A1), above block (B1), above-right block (B0), left-bottom block (A0) to above-left block (B2). In other words, the search order is A1→B1→B0→A0→B2 as shown in FIG. 3. The affine parameters of the affine coded blocks are used to derive the $v_0$ and $v_1$ for the current PU. In the example of FIG. 3, the neighbouring blocks (A0, A1, B0, B1, and B2) used to construct the control point MVs for affine motion model are referred as a neighbouring block set in this disclosure.

A six-parameter affine model has disclosed in JVET-K0337 (Han et al., "CE4.1.3: Affine motion compensation prediction", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0337) for the affine Merge mode and affine Inter mode. The six-parameter affine model uses 3 control points ($\vec{v}_0$, $\vec{v}_1$ and $\vec{v}_2$) as shown in FIG. 4A, where block 410 corresponds to a current PU. The six-parameter affine motion model is capable of transforming a rectangle into a parallelogram 420 as shown in FIG. 4B. When an affine motion block is moving, the motion vector field of the block can be described by three control point motion vectors or four parameters as follows, where (vx, vy) represents the motion vector $$\begin{cases} x' = ax + by + e \\ y' = cx + dy + f \\ vx = x - x' \\ vy = y - y' \end{cases} \quad (5)$$

When the MVs of three control points are decoded, the MV of each 4×4 block can be derived according to the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (6)$$

The MV of the centre pixel (i.e., position at (2, 2) of a 4×4 block) represents the MV of the 4×4 block.

In a system supporting both 4- and 6-parameter affine models, one parameter flag is signalled to indicate the selection of 4 or 6 parameter affine model. Furthermore, in affine inter mode,
  if 4-parameter affine model is used, 1 MVP pair and 2 MVDs are signalled,
  if 6-parameter affine model is used, 1 MVP triplet (with 3 MVPs) and 3 MVDs are signalled.

In this invention, methods utilizing motion compensation to improve coding performance of existing coding systems are disclosed.

For convenience, the term MVP set is used to refer to the MVP pair and the MVP triplet.

The affine motion model for deriving Merge candidate list in Merge mode coding has been shown to be a useful coding tool to handle more complex motion within the video sequence. It is desirable to develop affine motion techniques to further improve the system coding performance. Accordingly, various affine based motion vector prediction techniques have been disclosed in the present invention.

BRIEF SUMMARY OF THE INVENTION

Methods and apparatus of Inter prediction for video coding performed by a video encoder or a video decoder that utilizes motion vector prediction (MVP) to code a motion vector (MV) associated with a block coded with coding modes including affine Inter mode and affine merge mode are disclosed. According to one method, input data related to a current block at a video encoder side or a video bitstream corresponding to compressed data including the current block at a video decoder side are received. A neighbouring block set of the current block is then determined. If at least one neighbouring block is coded using an affine motion model, at least one inherited MVP is derived based on a corresponding control point MV set of said at least one neighbouring block. An affine MVP candidate list, including affine AMVP (advance MVP) candidate list or affine merge MVP list, is generated, wherein the affine MVP candidate list comprises said at least one inherited affine MVP. For candidates in the affine AMVP list, prediction differences of a current control-point MV set associated with the affine motion model are encoded using one predictor selected from the affine AMVP candidate list at the video encoder side or the prediction differences of the current control-point MV set associated with the affine motion model are decoded at the video decoder side using one predictor selected from the affine AMVP candidate list.

In one embodiment, the neighbouring block set comprises an above block (B1), an above-right block (B0), an above-left block (B2), a left block (A1) and a left-bottom block (A0). The predefined order can be A1→B1→B0→A0→B2. In another embodiment, the neighbouring block set is divided into a first subset and a second subset, and where the first subset comprises A0 and A1 and the second subset comprises B0, B1 and B2. For the case of two subsets, a first inherited affine MVP can be derived based on first control-point MV set of a firstly available first affine coded block in the first subset according to a first order of A0→A1, and a second inherited affine MVP can be derived based on second control-point MV set of a firstly available second affine coded block in the second subset according to a second order of B0→B1→B2.

Affine MVP list padding can be applied. For example, after said at least one inherited affine MVP is inserted into the affine MVP candidate list, a normal MVP from a normal MVP list is added to the affine MVP candidate list if the affine MVP candidate list is not full. Affine MVP list pruning can also be applied. For example, said at least one inherited affine MVP is removed or not inserted into the affine MVP candidate list if said at least one inherited affine MVP is the same as another affine MVP already in the affine MVP candidate list. In another example, said at least one inherited affine MVP is removed or not inserted into the affine MVP candidate list if difference of control point MVs between said at least one inherited affine MVP and another affine MVP in the affine MVP candidate list is smaller than a threshold. In yet another example, said at least one inherited affine MVP is removed or not inserted into the affine MVP candidate list if all control point MVs of said at least one inherited affine MVP are the same.

In another embodiment, at least one constructed affine MVP is derived based on a second control-point MV set derived from different neighbouring blocks if said at least one neighbouring block or two neighbouring blocks are coded using an inter prediction mode, where the affine MVP candidate list comprises said at least one constructed affine MVP. Said at least one inherited affine MVP can be inserted into the affine MVP candidate list before said at least one constructed affine MVP. In yet another embodiment, at least one constructed affine MVP is used if the affine MVP candidate list is less than a predefined number. Furthermore, said at least one constructed affine MVP can be removed or not inserted into the affine MVP candidate list if all control point MVs of said at least one inherited affine MVP are the same.

According to another method, if at least one neighbouring block is coded using an affine motion model and at least one of reference picture lists of said at least one neighbouring block includes one reference picture being the same as a current reference picture of the current block, at least one inherited affine MVP is derived based on a corresponding control-point MV set of said at least one neighbouring block. An affine MVP candidate list is generated by including said at least one inherited affine MVP into the affine MVP candidate list. For candidates in the affine AMVP list, prediction differences of a current control-point MV set associated with the affine motion model are encoded using one predictor selected from the affine AMVP candidate list at the video encoder side or the prediction differences of the current control-point MV set associated with the affine motion model are decoded at the video decoder side using one predictor selected from the affine AMVP candidate list.

In one embodiment, said at least one of reference picture lists of said at least one neighbouring block corresponds to a current reference picture list of the current block. In another embodiment, said at least one of reference picture lists of said at least one neighbouring block corresponds to one reference picture list different from a current reference picture list of the current block.

In one embodiment, if the affine MVP list is not full after the non-scaled inherited affine MVP is inserted, scaled inherited affine MVP can be derived and inserted into the affine MVP list. In this case, a scaled inherited affine MVP is derived by scaling the corresponding control-point MV set of an affined-coded neighbouring block, but the reference picture of the affined-coded neighbouring block is different from the reference picture of the current block. The reference picture of the affined-coded neighbouring block can be selected from the same reference picture list of the current block first. Alternatively, the reference picture of the affined-coded neighbouring block can be selected from the reference picture list different from that of the current block first.

Again, affine MVP list padding and pruning mentioned earlier can also be applied to the second method.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, various methods of utilizing affine motion estimation and compensation for video compression are disclosed. In particular, the affine motion estimation or compensation is used for coding video data in a Merge mode or an Inter prediction mode.

Affine AMVP Mode MVP Derivation

In the present invention, the affine motion model is used to derive affine MVP candidate for both affine advance MVP (AMVP) coding mode and affine merge mode. Furthermore, the affine MVP candidate list may include more than one affine MVP candidate. For a block coded in the AMVP mode, the index of candidate MVP pair selected is signalled in the bit stream. The MV difference (MVD) of the two control points are coded in the bitstream for 4-parameter affine model. The MV difference (MVD) of the three control points are coded in the bitstream for 6-parameter affine model. For a block coded in the affine merge mode, only the index of candidate MVP pair selected is signalled in the bit stream. In the following discussion, most examples are provided for the 4-parameter affine model with two control-point motion vectors for convenience. However, it is understood that the present invention is also applicable to the case of 6-parameter affine model with three control-point motion vectors.

Two kinds of affine candidates are used for the affine AMVP mode and affine merge mode. The two kinds of affine candidates correspond to the inherited affine candidate and the corner derived candidate. The derivation of the two kinds of affine candidates are briefly reviewed as follows.

Inherited Affine Candidate

Figure 1A:
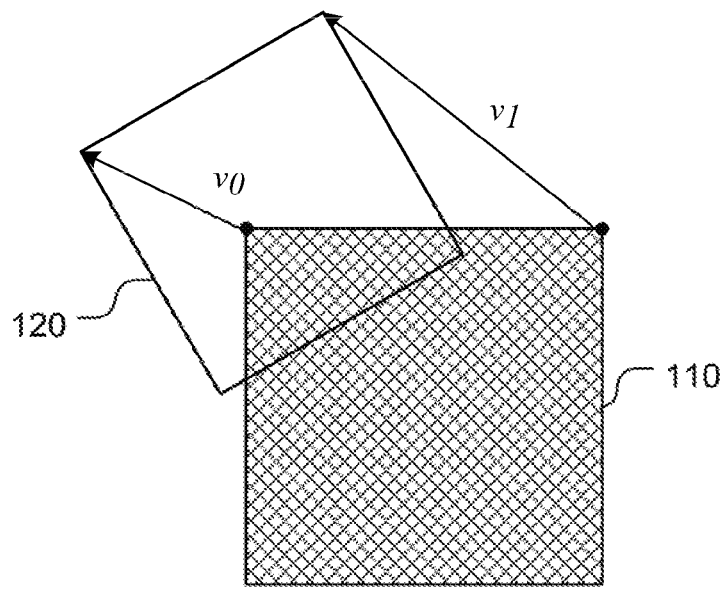
FIG. 1A illustrates an example of the four-parameter affine model, where the transformed block is still a rectangular block.
Figure 1B:
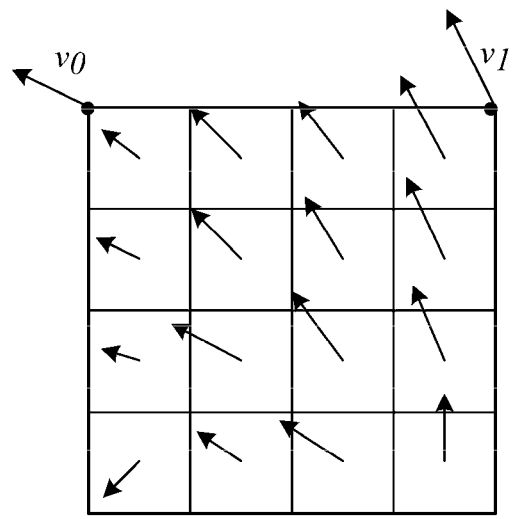
FIG. 1B illustrates an example of motion vectors for a current block determined for each 4×4 sub-block based on the MVs of the two control points.
Figure 2:
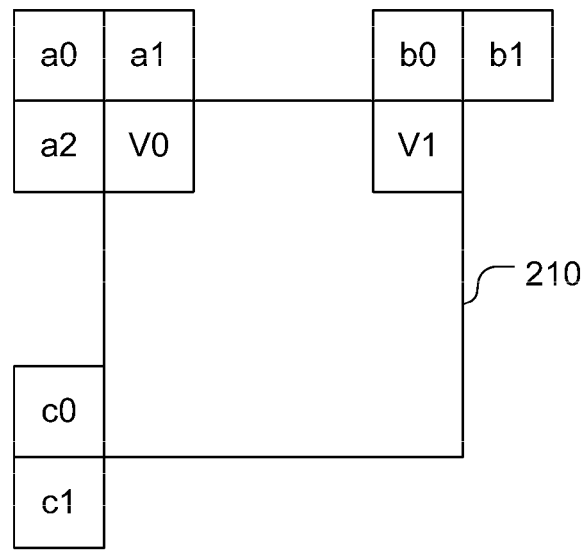
FIG. 2 illustrates the neighbouring block set used for deriving the corner derived affine candidate.
Figure 3:
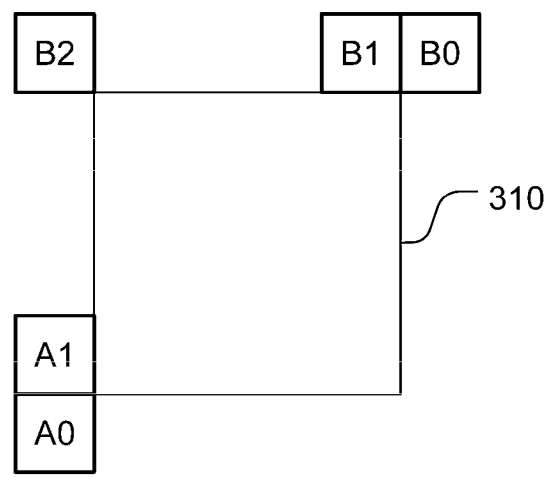
FIG. 3 illustrates the neighbouring block set used for deriving the inherited affine candidate.
Figure 4A:
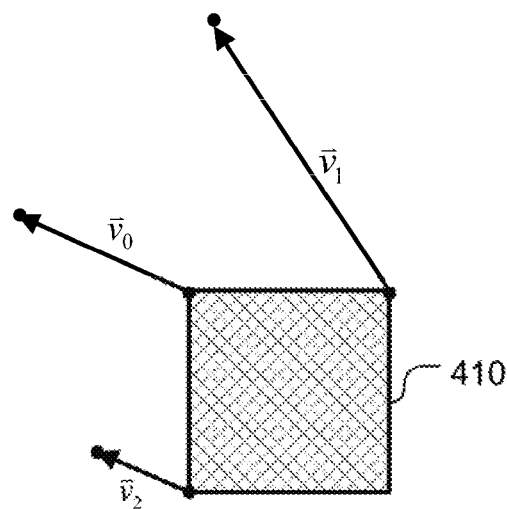
FIG. 4A illustrates an example of 3 control points ($\bar{v}_0$, $\bar{v}_1$ and $\bar{v}_2$) for the six-parameter affine model.
Figure 4B:
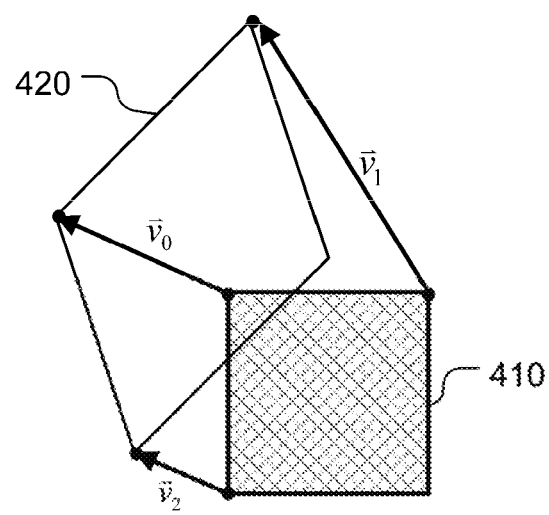
FIG. 4B illustrates an example of a six-parameter affine motion model that is capable of transforming a rectangle into a parallelogram.

The inherited affine candidate is derived by inheriting the affine model of neighbouring blocks. The neighbouring blocks used for deriving the inherited affine candidate are shown in FIG. 3, where blocks A0 and A1 around the lower left corner of the current block 310 and blocks B0, B1 and B2 above the current block 310 are used. Two candidates are derived. One candidate is derived from blocks A0 and A1. If block A0 is predicted using an affine mode and a reference picture in reference picture list 0 or list 1 points to the same as the target reference picture of the current block, the control point MVs of A0 are used as one inherited affine candidate. Otherwise, whether block A1 is predicted using an affine mode and a reference picture in reference list 0 or list 1 points to the same as the target reference picture of the current block is checked. If so, the control point MVs of A1 is used as one affine MVP candidate. In other words, the search order is (A0→A1). The same process is applied to the top neighbouring blocks in the order of (B0→B1→B2) to derive the other inherited affine candidate. For inherited affine candidate, control point MVs from the same neighbouring block are selected. In this disclosure, a reference picture list may also be referred as a reference list for convenience.

Corner Derived Candidate (or Constructed Candidate)

Figure 5:
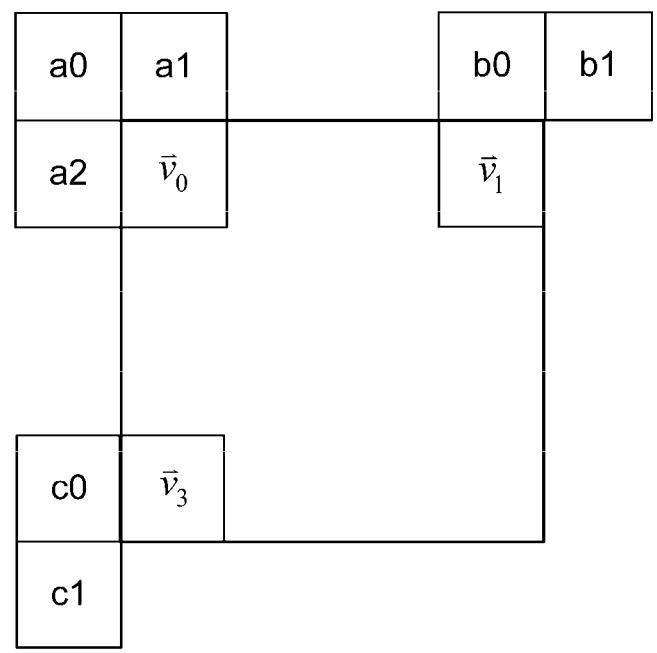
FIG. 5 illustrates an example of corner derived candidate, where each of three control-point motion vectors is derived from a set of neighbouring blocks.

For corner derived candidates, the control point MVs are derived from different neighbouring blocks. An example of corner derived candidate is shown in FIG. 5. The corner derived candidate $\bar{v}_0$ corresponds to the first available MV in neighbouring blocks {a0, a1, a2}. The corner derived candidate $\bar{v}_1$ corresponds to the first available MV in neighbouring blocks {b0, b1}, and the corner derived candidate $\bar{v}_2$ corresponds to the first available MV in neighbouring blocks {c0, c1}. The first available MV is the MV in either list 0 (i.e., L0) or list 1 (i.e., L1) that points to the same target reference picture as the current reference picture. For example, the search order can be b0-L0, b0-L1, b1-L0, and b1-L1. Only one corner derived affine candidate is inserted.

The inherited candidates can be inserted before the corner derived candidates in the affine MVP candidate list.

Affine MVP Pair Derivation in Affine AMVP mode

In ITU-T13-SG16-C-1016, the neighbouring MVs are used to form the MVP pair. In the present invention, it is proposed to use the affine information, {a, b, e, f} in equation (2), from the neighbouring blocks coded by affine mode to generate the affine MVP pair. For example, if the neighbouring block C1 is coded by the affine mode, then its affine information is used to derive one MV pair as the affine MVP pair, when the current block is coded by the affine mode. Based on equation (3), $(v_{0x}, v_{0y})$ and $(v_{1x}, v_{1y})$ of current block can be derived in equation (7):

$$\begin{cases} v_{0x} = e \\ v_{0y} = f \end{cases}, \text{ and } \begin{cases} v_{1x} = aW_{cur} - bH_{cur} + e \\ v_{1y} = -bW_{cur} + aH_{cur} + f \end{cases} \quad (7)$$

In the above equation, {a, b, e, f} are affine parameters used in neighbouring block C1. The priority of this affine MVP pair can be higher than the original method. According to an embodiment of the present invention, all affine MVP pairs generated by using the affine information from neighbouring blocks are inserted into MVP pair list first. After that, the MVP derivation based on the original method can be followed. In another embodiment, this proposed method can be interleaved with the original method on the MVP pair basis.

In another embodiment, for 4-parameter affine model, the MVs of the two control points MVPs of the spatial inherited affine candidate can be derived according to the following equations:

$$V_{0x}=V_{B0x}+(V_{B0y}-V_{B1y})*(\text{posCurCU\_Y}-\text{posRefCU\_Y})/\text{RefCU\_width}+(V_{B1x}-V_{B0x})*(\text{posCurCU\_X}-\text{posRefCU\_X})/\text{RefCU\_width}$$

$$V_{0y}=V_{B0y}+(V_{B1x}-V_{B0x})*(\text{posCurCU\_Y}-\text{posRefCU\_Y})/\text{RefCU\_width}+(V_{B1y}-V_{B0y})*(\text{posCurCU\_X}-\text{posRefCU\_X})/\text{RefCU\_width}$$

$$V_{1x}=V_{B0x}+(V_{B0y}-V_{B1y})*(\text{posCurCU\_Y}-\text{posRefCU\_Y})/\text{RefCU\_width}+(V_{B1x}-V_{B0x})*(\text{posCurCU\_X}+CU\_\text{width}-\text{posRefCU\_X})/\text{RefCU\_width}$$

$$V_{1y}=V_{B0y}+(V_{B1x}-V_{B0x})*(\text{posCurCU\_Y}-\text{posRefCU\_Y})/\text{RefCU\_width}+(V_{B1y}-V_{B0y})*(\text{posCurCU\_X}+CU\_\text{width}-\text{posRefCU\_X})/\text{RefCU\_width}$$

In the above equations, $V_{B0}$ and $V_{B1}$ can be replaced by the top-left MV and top-right MV of any reference/neighbouring CU respectively, (posCurCU_X, posCurCU_Y) are the pixel position of the top-left sample of the current CU relative to the top-left sample of the picture, (posRefCU_X, posRefCU_Y) are the pixel position of the top-left sample of the reference/neighbouring CU relative to the top-left sample of the picture.

For 6-parameter affine model, the MVs of the two control points MVPs of the spatial inherited affine candidate can be derived by following equation.

$$V_{0x}=V_{B0x}+(V_{B0y}-V_{B1y})*(\text{posCurCU\_Y}-\text{posRefCU\_Y})/\text{RefCU\_height}+(V_{B1x}-V_{B0x})*(\text{posCurCU\_X}-\text{posRefCU\_X})/\text{RefCU\_width}$$

$$V_{0y}=V_{B0y}+(V_{B1x}-V_{B0x})*(\text{posCurCU\_Y}-\text{posRefCU\_Y})/\text{RefCU\_height}+(V_{B1y}-V_{B0y})*(\text{posCurCU\_X}-\text{posRefCU\_X})/\text{RefCU\_width}$$

$$V_{1x}=V_{B0x}+(V_{B0y}-V_{B1y})*(\text{posCurCU\_Y}-\text{posRefCU\_Y})/\text{RefCU\_height}+(V_{B1x}-V_{B0x})*(\text{posCurCU\_X}+CU\_\text{width}-\text{posRefCU\_X})/\text{RefCU\_width}$$

$$V_{1y}=V_{B0y}+(V_{B1x}-V_{B0x})*(\text{posCurCU\_Y}-\text{posRefCU\_Y})/\text{RefCU\_height}+(V_{B1y}-V_{B0y})*(\text{posCurCU\_X}+CU\_\text{width}-\text{posRefCU\_X})/\text{RefCU\_width}$$

$$V_{2x}=V_{B0x}+(V_{B2x}-V_{B0x})*\text{posCurCU\_Y}+CU\_\text{height}-\text{posRefCU\_Y})/\text{RefCU\_height}+(V_{B1x}-V_{B0x})*(\text{posCurCU\_X}-\text{posRefCU\_X})/\text{RefCU\_width}$$

$$V_{2y}=V_{B0y}+(V_{B2y}-V_{B0y})*(\text{posCurCU\_Y}+CU\_\text{height}-\text{posRefCU\_Y})/\text{RefCU\_height}+(V_{B1y}-V_{B0y})*(\text{posCurCU\_X}-\text{posRefCU\_X})/\text{RefCU\_width}$$

In the above equations, $V_{B0}$, $V_{B1}$, and $V_{B2}$ can be replaced by the top-left MV, top-right MV and bottom-left MV of any reference/neighbouring CU respectively, (posCurCU_X, posCurCU_Y) are the pixel position of the top-left sample of the current CU relative to the top-left sample of the picture, (posRefCU_X, posRefCU_Y) are the pixel position of the top-left sample of the reference/neighbouring CU relative to the top-left sample of the picture.

The inherited affine model control point MVs derivation can also be represented as follows. First, some variables are defined:

luma location (xCb, yCb) specifying the top-left sample of the current luma coding block relative to the top-left luma sample of the current picture, two variables cbWidth and cbHeight specifying the width and the height of the current luma coding block, luma location (xNb, yNb) specifying the top-left sample of the neighbouring luma coding block relative to the top-left luma sample of the current picture, two variables nNbW and nNbH specifying the width and the height of the neighbouring luma coding block, the number of control point motion vectors numCpMv.

cpMvLX[cpIdx] are the luma affine control point vectors with cpIdx=0, ..., numCpMv−1 and X being 0 or 1 (0 for list 0 and 1 for list 1).

The variables log 2NbW and log 2NbH are derived as follows:

$$\log 2NbW=\text{Log } 2(nNbW),$$

$$\log 2NbH=\text{Log } 2(nNbH).$$

The variables mvScaleHor, mvScaleVer, dHorX and dVerX are derived as follows:

$$\text{mvScaleHor}=MvLX[xNb][yNb][0]<<7$$

$$\text{mvScaleVer}=MvLX[xNb][yNb][1]<<7$$

$$d\text{HorX}=(MvLX[xNb+nNbW-1][yNb][0]-MvLX[xNb][yNb][0])<<(7-\log 2NbW)$$

$$d\text{VerX}=(MvLX[xNb+nNbW-1][yNb][1]-MvLX[xNb][yNb][1])<<(7-\log 2NbW)$$

In the above equations, MvLX[xNb][yNb] corresponds to motion vector in position (xNb, yNb). The variables dHorY and dVerY are derived as follows:

If MotionModelIdc[xNb][yNb] is equal to 2, the following applies:

$$d\text{HorY}=(MvLX[xNb][yNb+nNbH-1][0]-MvLX[xNb][yNb][0])<<(7-\log 2NbH)$$

$$d\text{VerY}=(MvLX[xNb][yNb+nNbH-1][1]-MvLX[xNb][yNb][1])<<(7-\log 2NbH)$$

Otherwise (MotionModelIdc[xNb][yNb] is equal to 1), the following apply, $$d\text{HorY}=-d\text{VerX}$$

$$d\text{VerY}=d\text{HorX}$$

The luma affine control point motion vectors cpMvLX [cpIdx] with cpIdx=0, numCpMv−1 and X being 0 or 1 are derived as follows:

The first two control point motion vectors cpMvLX[0] and cpMvLX[1] are derived as follows:

$$cpMvLX[0][0]=(\text{mvScaleHor}+d\text{HorX}*(xCb-xNb)+d\text{HorY}*(yCb-yNb))$$

$$cpMvLX[0][1]=(\text{mvScaleVer}+d\text{VerX}*(xCb-xNb)+d\text{VerY}*(yCb-yNb))$$

$$cpMvLX[1][0]=(\text{mvScaleHor}+d\text{HorX}*(xCb+cb\text{Width}-xNb)+d\text{HorY}*(yCb-yNb))$$

$$cpMvLX[1][1]=(\text{mvScaleVer}+d\text{VerX}*(xCb+cb\text{Width}-xNb)+d\text{VerY}*(yCb-yNb))$$

If numCpMv is equal to 3, the third control point vector cpMvLX[2] is derived as follows:

$$cpMvLX[2][0]=(\text{mvScaleHor}+d\text{HorX}*(xCb-xNb)+d\text{HorY}*(yCb+cb\text{Height}-yNb))$$

$$cpMvLX[2][1]=(\text{mvScaleVer}+d\text{VerX}*(xCb-xNb)+d\text{VerY}*(yCb+cb\text{Height}-yNb))$$

The insertion order can be predefined. For example, the neighbouring inherited affine MVP pair can be inserted as the order of "A1→B1→B0→A0→B2". The neighbouring inherited affine MVP pair can be inserted to the affine MVP candidate list according to the predefined order. In one example, if one of the neighbouring blocks is affine coded block and one of the reference lists of the block points to the current target reference picture, the affine MVP pair is selected for deriving the candidate and inserted into the candidate list. The same reference list as the current target reference list can be checked first or later. For example, if the same reference list as the current target reference list is checked first and the current target reference list is list 1. In a block at position A1, the reference picture in list 1 is first checked; if the reference picture is not equal to the current target reference picture, then the reference picture in list 0 is checked. If the reference picture in list 0 is equal to the target reference picture, the affine MVP pair is selected for deriving the candidate and inserted into the MVP candidate list. If the reference picture in both list 0 and list 1 are not equal to the current target reference picture, the affine MVP pair is not selected for deriving the candidate.

In another embodiment, following the predefined order, blocks in B1, B0, A0, and B2 will be checked until the affine MVP candidate list is full. For example, if one of the neighbouring blocks is an affine coded block and the block points to the current target reference picture in the same reference list as the current target reference list, the affine MVP pair is selected for deriving the candidate and inserted into the candidate list. In yet another example, if one of the neighbouring blocks is affine coded block and the block points to the current target reference picture in the other reference list of the current target reference list, the affine MVP pair is selected for deriving the candidate and inserted into the candidate list. After the above process, if the candidate list is not full, the scaled affine MVP pair can be added. Motion vector scaling is known in the art. When a motion vector points to a reference picture other than the current reference picture, a scaled MV can be derived from the original MV according to the picture distances. The scaled control point MVs can be used as the neighbouring inherit affine MVP pair. For example, the available control point MVs are scaled to the target reference picture as one of the MVP candidates. The order regarding which reference list control point MVs should be scaled first can be pre-defined or derived. For example, the same reference list can be checked first or later.

In one embodiment, if an affine coded block is already used for generating an affine MVP pair, it can be skipped in the affine MVP pair generation process. For example, if an affine coded block is already used for generating an affine MVP pair without MV scaling, then it will not be used to generate the affine MVP pair with MV scaling. In another example, under the predefined block scan order, the non-scaled affine MVP pair and/or scaled affine MVP pair is inserted one by one. For example, the affine MVP pair can be inserted in the following order: the non-scaled affine MVP pair of A1, the scaled MVP pair of A1, the non-scaled affine MVP pair of B1, the scaled affine MVP pair of B1, and so on. Also, if the non-scaled affine MVP pair is has been used, the scaled affine MVP pair can be skipped.

Figure 6:
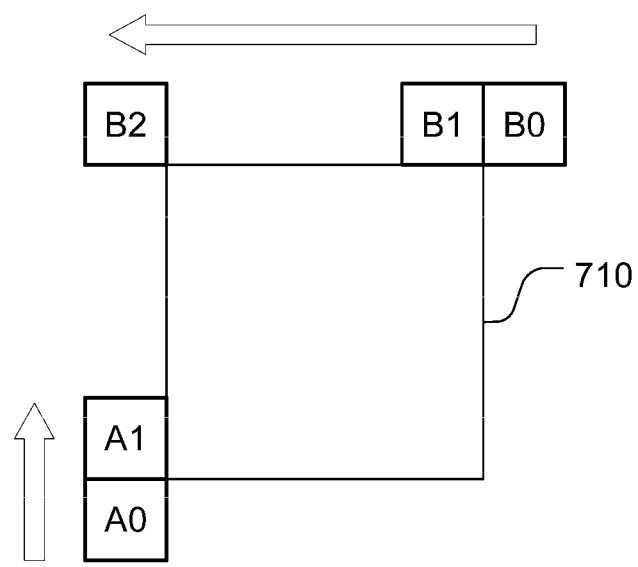
FIG. 6 illustrates an example of inherited candidates using a two-branch process, where one inherited candidate is derived from blocks A0 and A1 and another inherited candidate is derived from blocks B0, B1 and B2.

In another example, the insertion order is different. As shown in FIG. 6, it has two branches of processes for a current block 710. In the first branch, the left blocks are scanned first. It derives one affine MVP candidate pair from the left blocks (e.g. A0 first and then A1, or A1 first and then A0). The similar process mentioned above can be used. For example, if one of the neighbouring blocks is affine coded block and a reference picture in the reference list of the neighbouring block that is the same as the current target reference list of the current block points to the current target reference picture, the affine MVP pair is selected for deriv-ing the candidate and inserted into the candidate list). The first available MV is used. The reference list of the neigh-bouring block being same as the current target reference list can be checked first or later. For example, if the same reference list as the current target reference list is checked first and the current target reference list is list 1, then the reference picture in list 1 is first checked for the block at position A0. If the reference picture is not equal to the current target reference picture, the reference picture in list 0 is checked. If the reference picture in list 0 is equal to the target reference picture, the affine MVP pair is selected for deriving the candidate and inserted into the candidate list; and the block A1 will not be further checked. If the reference picture of block A0 in both list 0 and lit1 is not equal to the current target reference picture, the affine MVP pair is not selected for deriving the candidate; and then the reference picture in block A1 will be checked. If the reference picture in list 1 is equal to the current target reference picture, the affine MVP pair is selected for deriving the candidate and inserted to the affine MVP list. If none of them is available, the scaled affine MVP pair mentioned above can be used. For example, the available control point MVs can be scaled to the target reference picture as one of the affine MVP candidates.

In one embodiment, if an affine coded block is already used for generating an affine MVP pair without MV scaling, then it will not be used to generate the affine MVP pair with MV scaling. In the second branch, the above blocks are scanned. It derives one affine MVP candidate pair from the above blocks according to a search order (e.g. from B0 to B2 or from B2 to B0). The similar process of the first branch can be applied. The first available one is used. The same reference list as the current target reference list can be checked first or later. For example, if the current target reference list is list 1, reference list 1 is checked first. For block at position B0, the reference picture in list 1 is first checked. If the reference picture is not equal to current target reference picture, the reference picture in list 0 is checked. If the reference picture in list 0 is equal to the target reference picture, the affine MVP pair is selected for deriv-ing the candidate and inserted into the candidate list. In this case, B1 and B2 will not be checked. If the reference picture of block B0 in both list 0 and list 1 of block B0 are not equal to the current target reference picture, the affine MVP pair is not selected for deriving the candidate, and then the refer-ence picture in block B1 will be checked. If the reference picture in list 1 is equal to the current target reference picture, the affine MVP pair is selected for deriving the candidate and inserted to the affine MVP list. In this case, block B2 will not be further checked. If the reference picture in both list 0 and list 1 of block B1 are not equal to the current target reference picture, block B2 will be checked. If the reference picture in list 1 of block B2 is equal to the current target reference picture, the affine MVP pair is selected for deriving the candidate and inserted to the affine MVP list. In another example, according to the predefined block scan order, the non-scaled affine MVP pair and/or scaled affine MVP pair is inserted one pair by one pair. For example, insert the affine MVP pair in the following order in first branch: the non-scaled affine MVP pair of A0, the scaled affine MVP pair of A0, the non-scaled affine MVP pair of A1, and then the scaled affine MVP pair of A1. Also, if the non-scaled affine MVP pair is already in the affine MVP candidate list, the scaled affine MVP pair can be skipped.

Note that, the pruning can be performed for the to-be-added affine MVP pair to prevent redundancy. The pruning process can be a) checking whether all the control point MVs are the same as one of the MVP pairs, b) checking whether MV difference of the control point MVs with one or more already-in-the-list affine MVP pair is smaller than a threshold.

Furthermore, if the derived MVs of all the control points in an affine MVP pair are the same (i.e., the affine model being a translational motion model), the derived affine MVP pair can be discarded or not inserted into the candidate list. Alternatively, the priority of this kind of affine MVP pair is moved to low priority (i.e., being inserted into the list if no other candidates existing or the candidate list not full).

The priority of this affine MVP pair can be higher than the original method. For example, all affine MVP pairs gener-ated by using affine information from neighbouring blocks can be inserted into affine MVP pair list first. The original method can be followed afterward. The affine MVP candi-date generated by the original method or the normal method refers to the method not using the affine information. In another embodiment, the present proposed method can be interleaved with the original method one an affine MVP pair basis.

If the number of the affine MVP pairs is less than a predefined value (e.g. 2), the corner derived affine candidate can be used. The neighbouring motion vectors, as shown in FIG. 5, can be used to derive the affine MVP pair. For the first corner derived affine candidate, the first available MV in set A (i.e., blocks a0, a1, and a2) and first available MV in set B (i.e., blocks b0 and b1) are used to construct the first MVP pair. For the second corner derived affine candidate, the first available MV in set A and first available MV in set C (i.e., blocks c0 and c1) are used to calculate the MV of top-right control point. The first available MV in set A and the calculated top-right control point MV are the second affine MVP pair. Also, if the derived MVs of all the control points in an affine MVP pair are the same (i.e., the affine model being a translational motion model), the derived affine MVP pair can be discarded or not inserted into the candidate list. Alternatively, the priority of this kind of affine MVP pair is moved to low priority (e.g. being inserted into the list if no other candidate existing or the candidate list not full).

If after adding the neighbouring inherit affine and corner affine MVP, the number of affine MVP is still less than the predefined value, the normal AMVP MVP is used. Two control points of the affine MVP pair are filled with the same MV from one of the MVP in the normal AMVP MVP list.

In the embodiments of the present invention as disclosed above, two control point MVP pairs are used as the examples for 4-parameter affine motion models. Nevertheless, the present invention is not limited to the 4-parameter affine model. The present invention can be applied to other affine models, such as 6-parameter model. For the 6-parameter affine model, the MVP set can be a MVP triplet (i.e., three MVs) or a MV set.

The above embodiments can also be applied to both affine AMVP and affine merge mode candidate list construction.

Any of the foregoing proposed methods can be implemented in encoders and/or decoders. For example, any of the proposed methods can be implemented in an affine MV/MVP generation module at an encoder side or a decoder side. Alternatively, any of the proposed methods can be implemented as a circuit coupled to the affine MV/MVP generation module of the encoder and/or the decoder so as to provide the information needed by the affine MV/MVP generation module.

Figure 7:
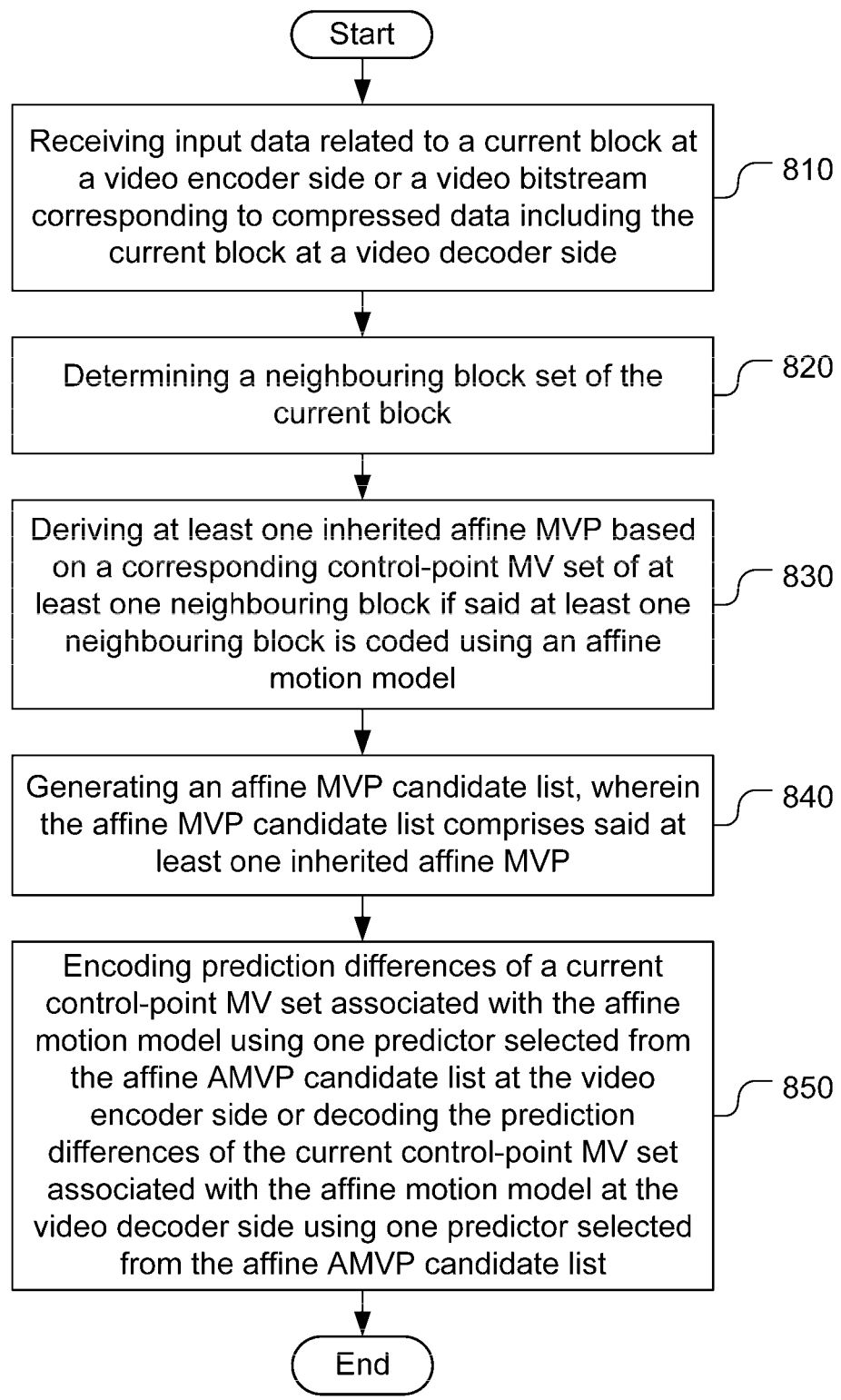
FIG. 7 illustrates an exemplary flowchart for a video coding system with an affine Inter mode incorporating an embodiment of the present invention, where the system uses an affine MVP candidate list for coding the motion information of the current block.

FIG. 7 illustrates an exemplary flowchart for a video coding system with an affine Inter mode incorporating an embodiment of the present invention, where the system uses an affine MVP candidate list for coding the motion information of the current block. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block are received at a video encoder side or a video bitstream corresponding to compressed data including the current block is received at a video decoder side in step 810. The method can be applied for encoding as well as decoding. Therefore, the data inputs for the encoder and the decoder are recited accordingly in step 810. A neighbouring block set of the current block is determined in step 820. In step 830, at least one inherited affine MVP is derived based on a corresponding control-point MV set of at least one neighbouring block if said at least one neighbouring block is coded using an affine motion model. In step 840, an affine MVP candidate list is generated, wherein the affine MVP candidate list comprises said at least one inherited affine MVP. In step 850, prediction differences of a current control-point MV set associated with the affine motion model is encoded using one predictor selected from the affine MVP candidate list at the video encoder side or the prediction differences of the current control-point MV set associated with the affine motion model at the video decoder side is decoded using one predictor selected from the affine MVP candidate list.

Figure 8:
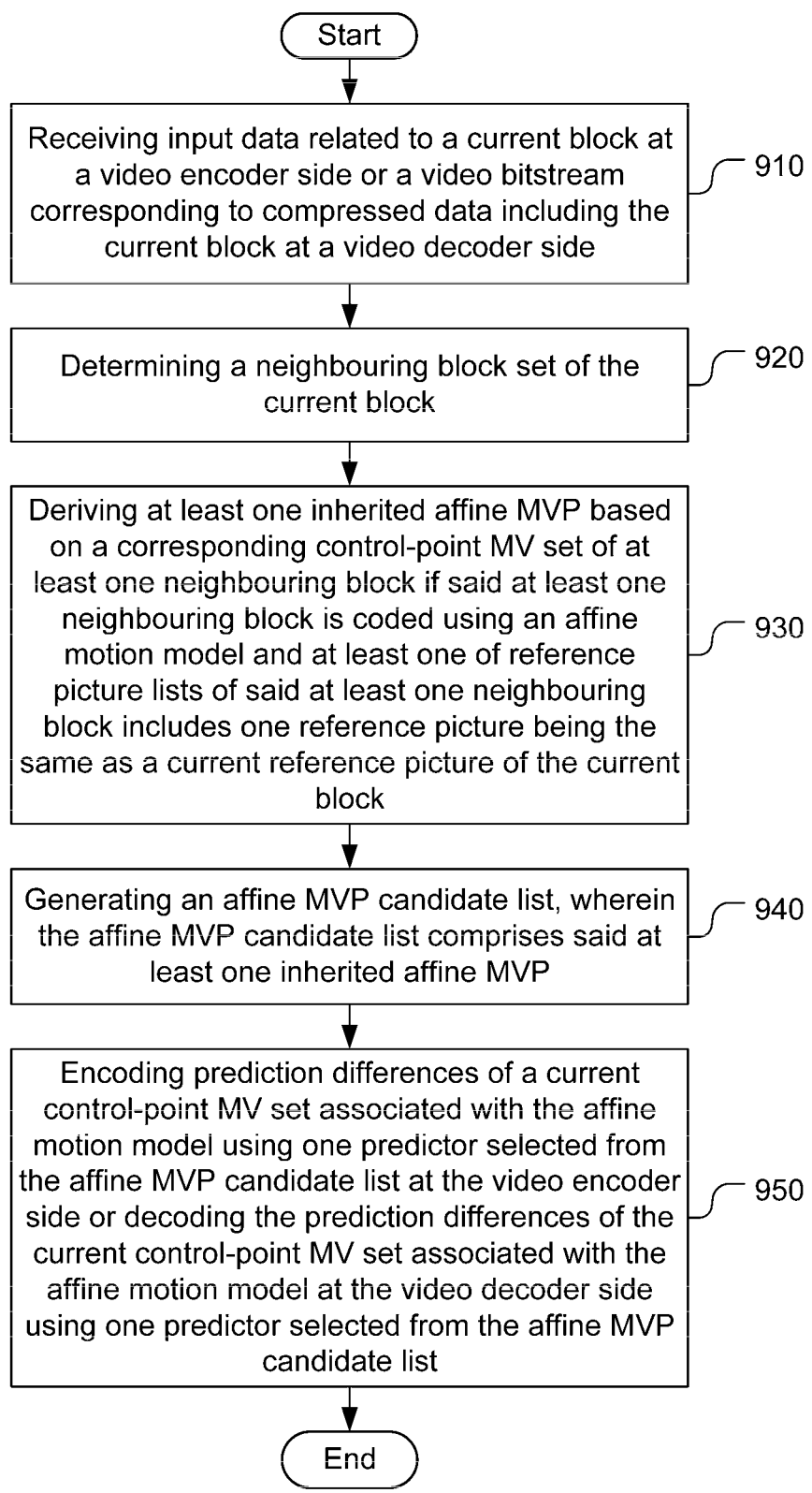
FIG. 8 illustrates another exemplary flowchart for a video coding system with an affine Inter mode incorporating an embodiment of the present invention, where the system uses an affine MVP candidate list for coding the motion information of the current block.

FIG. 8 illustrates another exemplary flowchart for a video coding system with an affine Inter mode incorporating an embodiment of the present invention, where the system uses an affine MVP candidate list for coding the motion information of the current block. According to this method, input data related to a current block are received at a video encoder side or a video bitstream corresponding to compressed data including the current block is received at a video decoder side in step 910. The method can be applied for encoding as well as decoding. Therefore, the data inputs for the encoder and the decoder are recited accordingly in step 910. A neighbouring block set of the current block is determined in step 920. In step 930, at least one inherited affine MVP is derived based on a corresponding control-point MV set of at least one neighbouring block if said at least one neighbouring block is coded using an affine motion model and at least one of reference picture lists of said at least one neighbouring block includes one reference picture being the same as a current reference picture of the current block. In step 940, an affine MVP candidate list is generated, wherein the affine MVP candidate list comprises said at least one inherited affine MVP. In step 950, prediction differences of a current control-point MV set associated with the affine motion model is encoded using one predictor selected from the affine MVP candidate list at the video encoder side or the prediction differences of the current control-point MV set associated with the affine motion model at the video decoder side is decoded using one predictor selected from the affine MVP candidate list.

The flowcharts shown are intended to illustrate an example of video according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding performed by a video encoder or a video decoder that utilizes motion vector prediction (MVP) to code a motion vector (MV) associated with a block coded with coding modes including an affine motion mode, the method comprising:
    receiving input data related to a current block at a video encoder side or a video bitstream corresponding to compressed data including the current block at a video decoder side;
    determining a neighbouring block set of the current block;
    deriving at least one inherited affine MVP based on a corresponding control-point MV set of at least one neighbouring block if said at least one neighbouring block is coded using an affine motion model;
    generating an affine MVP candidate list, wherein the affine MVP candidate list comprises said at least one inherited affine MVP; and
    encoding prediction differences of a current control-point MV set associated with the affine motion model using one predictor selected from the affine MVP candidate list at the video encoder side or decoding the prediction differences of the current control-point MV set associated with the affine motion model at the video decoder side and reconstruct the current control-point MV set using one predictor selected from the affine MVP candidate list.

2. The method of claim 1, wherein the neighbouring block set comprises an above block (B1), an above-right block (B0), an above-left block (B2), a left block (A1) and a left-bottom block (A0).

3. The method of claim 2, wherein whether any neighbouring block is coded using the affine motion model is checked according to a predefined order corresponding to A1→B1→B0→A0→B2.

4. The method of claim 2, wherein the neighbouring block set is divided into a first subset and a second subset, and wherein the first subset comprises A0 and A1 and the second subset comprises B0, B1 and B2.

5. The method of claim 4, wherein a first inherited affine MVP is derived based on first control-point MV set of a firstly available first affine coded block in the first subset according to a first order of A0→A1, and a second inherited affine MVP is derived based on second control-point MV set of a firstly available second affine coded block in the second subset according to a second order of B0→B1→B2.

6. The method of claim 1, wherein after said at least one inherited affine MVP is inserted into the affine MVP candidate list, a normal MVP from a normal MVP list is added to the affine MVP candidate list if the affine MVP candidate list is not full.

7. The method of claim 1, wherein said at least one inherited affine MVP is removed or not inserted into the affine MVP candidate list if said at least one inherited affine MVP is the same as another affine MVP already in the affine MVP candidate list.

8. The method of claim 1, wherein said at least one inherited affine MVP is removed or not inserted into the affine MVP candidate list if difference of control point MVs between said at least one inherited affine MVP and another affine MVP in the affine MVP candidate list is smaller than a threshold.

9. The method of claim 1, wherein said at least one inherited affine MVP is removed or not inserted into the affine MVP candidate list if all control point MVs of said at least one inherited affine MVP are the same.

10. The method of claim 1, further comprising deriving at least one constructed affine MVP based on a second control-point MV set derived from different neighbouring blocks if said at least one neighbouring block or two neighbouring blocks are coded using an inter prediction mode, wherein the affine MVP candidate list comprises said at least one constructed affine MVP.

11. The method of claim 10, wherein said at least one inherited affine MVP is inserted into the affine MVP candidate list before said at least one constructed affine MVP.

12. The method of claim 1, when a number of affine MVP candidates in the affine MVP candidate list is less than a predefined number, at least one constructed affine MVP is derived based on a second control-point MV set derived from different neighbouring blocks if said at least one neighbouring block or two neighbouring blocks are coded using an inter prediction mode, wherein the affine MVP candidate list comprises said at least one constructed affine MVP.

13. The method of claim 12, wherein said at least one constructed affine MVP is removed or not inserted into the affine MVP candidate list if all control point MVs of said at least one inherited affine MVP are the same.

14. An apparatus for Inter prediction for video coding performed by a video encoder or a video decoder that utilizes motion vector prediction (MVP) to code a motion vector (MV) associated with a block coded with coding modes including an affine motion mode, the apparatus comprising one or more electronic circuits or processors arranged to:
    receive input data related to a current block at a video encoder side or a video bitstream corresponding to compressed data including the current block at a video decoder side;
    determine a neighbouring block set of the current block;
    derive at least one inherited affine MVP based on a corresponding control-point MV set of at least one neighbouring block if said at least one neighbouring block is coded using an affine motion model;
    generate an affine MVP candidate list, wherein the affine MVP candidate list comprises said at least one inherited affine MVP; and
    encode prediction differences of a current control-point MV set associated with the affine motion model using one predictor selected from the affine MVP candidate list at the video encoder side or decode the prediction differences of the current control-point MV set associated with the affine motion model at the video decoder side using one predictor selected from the affine MVP candidate list.

15. A method of Inter prediction for video coding performed by a video encoder or a video decoder that utilizes motion vector prediction (MVP) to code a motion vector (MV) associated with a block coded with coding modes including an affine motion mode, the method comprising:
receiving input data related to a current block at a video encoder side or a video bitstream corresponding to compressed data including the current block at a video decoder side;
determining a neighbouring block set of the current block;
deriving at least one inherited affine MVP based on a corresponding control-point MV set of at least one neighbouring block if said at least one neighbouring block is coded using an affine motion model and at least one of reference picture lists of said at least one neighbouring block includes one reference picture being the same as a current reference picture of the current block;
generating an affine MVP candidate list, wherein the affine MVP candidate list comprises said at least one inherited affine MVP; and
encoding prediction differences of a current control-point MV set associated with the affine motion model using one predictor selected from the affine MVP candidate list at the video encoder side or decoding the prediction differences of the current control-point MV set associated with the affine motion model at the video decoder side and reconstruct the current conrol-point MV set using one predictor selected from the affine MVP candidate list.

16. The method of claim 15, wherein said at least one of reference picture lists of said at least one neighbouring block corresponds to a current reference picture list of the current block.

17. The method of claim 15, wherein said at least one of reference picture lists of said at least one neighbouring block corresponds to one reference picture list different from a current reference picture list of the current block.

18. The method of claim 15, wherein after said at least one inherited affine MVP is inserted into the affine MVP candidate list, if the affine MVP candidate list is not full:
if a selected neighbouring block is coded in the affine motion model and a target reference picture of the selected neighbouring block is different from the current reference picture of the current block:
deriving a scaled inherited affine MVP by scaling the corresponding control-point MV set of the target neighbouring block from the target reference picture to the current reference picture; and
inserting the scaled inherited affine MVP into the affine MVP candidate list.

19. The method of claim 18, wherein the target reference picture in a same reference picture list as a current reference picture list of the current block is checked before the target reference picture in a different reference picture list from the current reference picture list of the current block.

20. The method of claim 18, wherein the target reference picture in a same reference picture list as a current reference picture list of the current block is checked after the target reference picture in a different reference picture list from the current reference picture list of the current block.

21. The method of claim 18, wherein if one inherited affine MVP derived from the selected neighbouring block is already inserted into the affine MVP candidate list, including the scaled inherited affine MVP into the affine MVP candidate list is skipped.

22. The method of claim 18, wherein the scaled inherited affine MVP derived from the selected neighbouring block is inserted into the affine MVP candidate list in a position after a corresponding inherited affine MVP derived from the selected neighbouring block.

23. The method of claim 15, wherein after said at least one inherited affine MVP is inserted into the affine MVP candidate list, if the affine MVP candidate list is not full, a normal MVP from a normal MVP list is added to the affine MVP candidate list.

24. The method of claim 15, wherein said at least one inherited affine MVP is removed or not inserted into the affine MVP candidate list, if said at least one inherited affine MVP is the same as another affine MVP already in the affine MVP candidate list.

25. The method of claim 15, wherein said at least one inherited affine MVP is removed or not inserted into the affine MVP candidate list if difference of control point MVs between said at least one inherited affine MVP and another affine MVP in the affine MVP candidate list is smaller than a threshold.

26. The method of claim 15, wherein said at least one inherited affine MVP is removed or not inserted into the affine MVP candidate list if all control point MVs of said at least one inherited affine MVP are the same.

27. The method of claim 15, further comprising deriving at least one constructed affine MVP based on a second control-point MV set derived from different neighbouring blocks if said at least one neighbouring block or two neighbouring blocks are coded using an inter prediction mode, wherein the affine MVP candidate list comprises said at least one constructed affine MVP.

28. The method of claim 27, wherein said at least one inherited affine MVP is inserted into the affine MVP candidate list before said at least one constructed affine MVP.

29. The method of claim 15, when a number of affine MVP candidates in the affine MVP candidate list is less than a predefined number, at least one constructed affine MVP is derived based on a second control-point MV set derived from different neighbouring blocks if said at least one neighbouring block or two neighbouring blocks are coded using an inter prediction mode, wherein the affine MVP candidate list comprises said at least one constructed affine MVP.

30. The method of claim 29, wherein said at least one constructed affine MVP is removed or not inserted into the affine MVP candidate list if all control point MVs of said at least one inherited affine MVP are the same.

31. An apparatus for Inter prediction for video coding performed by a video encoder or a video decoder that utilizes motion vector prediction (MVP) to code a motion vector (MV) associated with a block coded with coding modes including an affine motion mode, the apparatus comprising one or more electronic circuits or processors arranged to:
receive input data related to a current block at a video encoder side or a video bitstream corresponding to compressed data including the current block at a video decoder side;
determine a neighbouring block set of the current block;
derive at least one inherited affine MVP based on a corresponding control-point MV set of at least one neighbouring block if said at least one neighbouring block is coded using an affine motion model and at least one of reference picture lists of said at least one neighbouring block includes one reference picture being the same as a current reference picture of the current block;

generate an affine MVP candidate list, wherein the affine MVP candidate list comprises said at least one inherited affine MVP; and encode prediction differences of a current control-point MV set associated with the affine motion model using one predictor selected from the affine MVP candidate list at the video encoder side or decode the prediction differences of the current control-point MV set associated with the affine motion model at the video decoder side using one predictor selected from the affine MVP candidate list.

* * * * *